(No Model.)
W. E. EASTMAN.
THERMOMETER ATTACHMENT FOR RAILWAY CARS.
No. 553,231. Patented Jan. 21, 1896.
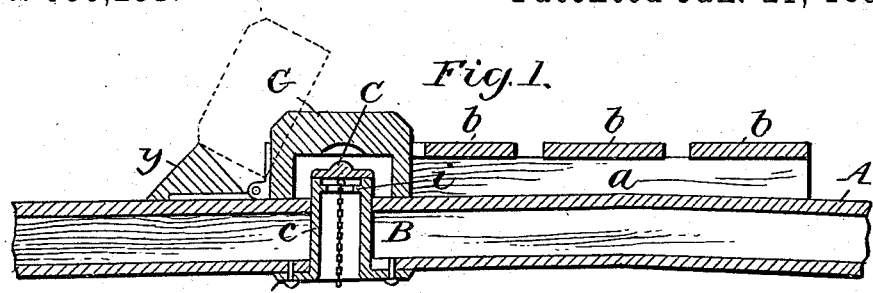
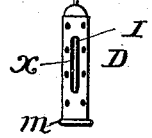
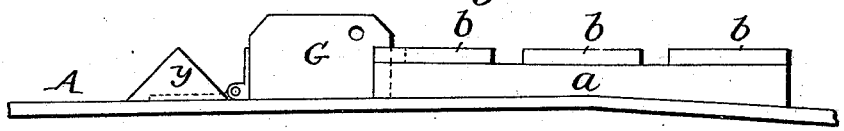
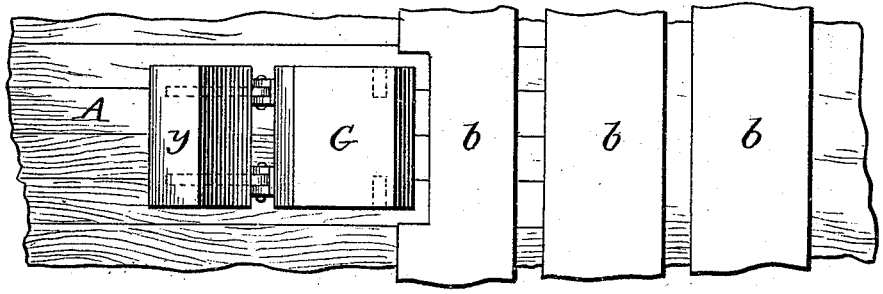
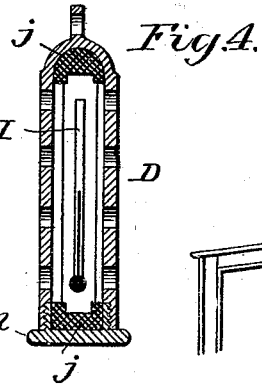
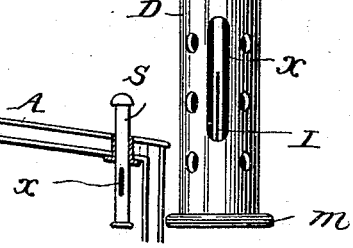
Witnesses
J. G. Hinkel
E. Everitt Ellis
Inventor
William E. Eastman
by Loren Freeman
Attorneys
ANDREW B.GRAHAM, PHOTO-LITHO. WASHINGTON, D.C.

UNITED STATES PATENT OFFICE.

WILLIAM E. EASTMAN, OF LACONIA, NEW HAMPSHIRE.

THERMOMETER ATTACHMENT FOR RAILWAY-CARS.

SPECIFICATION forming part of Letters Patent No. 553,231, dated January 21, 1896.

Application filed December 22, 1894. Serial No. 532,671. (No model.)

*To all whom it may concern:*

Be it known that I, WILLIAM E. EASTMAN, a citizen of the United States, residing at Laconia, in the county of Belknap and State of New Hampshire, have invented certain new and useful Improvements in Thermometer Attachments for Cars, of which the following is a specification.

In the transportation of fruits, meat, and other articles which it is necessary to convey in what are termed "refrigerating-cars" it is essential that a certain temperature shall be preserved during the entire time that the articles are stowed in the cars, and it has therefore become customary to make provision whereby the said cars shall be inspected at various points upon the route with the view of having the inspectors ascertain if there is anything wrong with the refrigerating apparatus, and in case of undue variation in temperature make correction before injury has been done. For this purpose it is necessary to provide each car with a thermometer and to provide means whereby the said thermometer may be inspected at the various stations.

It has been found almost impossible to prevent the stealing of the thermometers with which the cars are provided, and independent of the loss of the instruments, which is trifling, a very serious loss is apt to result from the fact that the temperature cannot be ascertained in the absence of the instrument and the cargoes become injured or destroyed.

It would be easy to secure the thermometers in fixed positions within the cars if the latter were open at the inspecting points, but the cars are sealed at the sending-station and are maintained sealed until they reach the receiving-station, and it is therefore necessary either to place the thermometers so that they can be seen from the outside in order to preserve them from being stolen, or to render them in some way accessible to inspectors, in which case they are also accessible to the brakemen and others who steal the same.

A serious objection to placing the thermometers in a position where they can be seen from the outside is that in such case they must be so near the sides of the car that the temperature is affected and the instruments do not truly indicate the temperature within the car. In order to overcome these objections, I suspend or otherwise arrange the thermometers at the desired points and provide the same with means whereby they can be withdrawn from the cars sufficient to permit them to be inspected but without permitting their entire withdrawal.

The thermometers may be combined with various devices which serve as a means of suspending or supporting them in the desired positions and of withdrawing them partially from the car. I will now describe those which I have found to be most effective, referring to the accompanying drawings, in which—

Figure 1 is a part transverse section of sufficient of the top of a refrigerator-car and attachment to illustrate my improvement. Fig. 2 is a side view of the part shown in Fig. 1. Fig. 3 is a plan view. Fig. 4 is an enlarged longitudinal section of the thermometer-case; Fig. 5, an external view of the thermometer-case. Fig. 6 is a view illustrating a modification.

A represents the top of the car along which extend struts $a$, supporting the foot-boards $b$, furnishing a way for the inspector who traverses the train from end to end upon these ways, passing from car to car in the same manner as the brakemen traverse the tops of the cars in the usual course of their duty.

At any suitable point in the top of the car, but preferably near one side of the footway, is made an opening for the reception of a cast-metal socket-piece B, which has a hollow shank $c$ with an internal flange $i$ and a lower flange $e$, which fits against the inside of the top of the car to which it is suitably screwed or bolted, and upon the upper open end of the said socket-piece rests a cap C having an eye at the under side, to which is connected one end of a chain $d$. The other end of the chain $d$ is attached to the case D of the thermometer, the said case consisting of cast metal perforated to permit the air to pass freely through the same with an elongated opening $x$ at one side, through which may be examined the stem of the thermometer I, the latter having an index, the ends of which bear against rubber or felt blocks or pads $j\,j$ inside the case.

The case D of the thermometer is sufficiently strong that it cannot be broken without breaking the thermometer also, so there will be no temptation to break the same for the sake of getting the thermometer, and the said case is of such a diameter that it can pass through the opening within the flange $i$ of the socket-piece B; but a flange $m$ at the lower end of the case D prevents the entire withdrawal of the case D through the socket-piece B, so that the case can be carried upward through the opening in the flange of the socket-piece until the flange $m$ of the case strikes against the flange $i$, when the further upward movement of the case is prevented. In this position, however, the case is sufficiently elevated above the top of the socket-piece to permit the thermometer to be freely seen through the opening $x$.

In order to prevent the access of moisture and the clogging up of the parts by snow and ice, a cap or cover G, of wood or other suitable material, is hinged to the top of the car at one side, so that it can fall over the upper end of the socket-piece and its cap, and so, also, that it can be tilted over to the position shown in dotted lines until it makes contact with a stop $y$, which prevents it from being turned to a vertical position, and thereby insures its falling down and over the socket-piece whenever the pressure to raise the same is removed.

It is essential that the theremometer shall occupy a position at some distance from the top or side of the car, say about two feet below the top, in order to ascertain properly the temperature of the interior of the car, and the chain $d$ is therefore made of such a length as will support the thermometer in its proper position. When an inspector desires to ascertain the temperature of the cars at the station, he begins at one end of the train and, raising the cover G of the first car, he seizes the cap C, lifts the same, together with the chain $d$, until the thermometer is sufficiently exposed to ascertain and record the temperature indicated. He then lets the chain slide downward until the cap C again rests upon the socket-piece B and removes the pressure tilting back the cover G, when the latter falls in place and covers the end of the socket-piece and its cap. He then proceeds along the way to the next car and does the same thing, and so on until he has passed in a direct line the whole length of the train.

While I prefer to use a chain, so as to suspend the thermometer within the car, this is not absolutely necessary, as I may make use of a sliding tube S, as shown in Fig. 6, which slides through a socket-piece in the top of the car until the thermometer within the tube is exposed. The chain arrangement, however, is better, as it does not interfere with the stowing of the contents of the car to so great an extent as would a rigid support.

It will be evident that the temperature within the car is not material in connection with my invention and that when goods are transported in cars that are heated the same combination of parts will enable the temperature to be ascertained and the proper temperature to be maintained.

Without limiting myself to the precise construction and arrangement of parts shown, I claim as my invention—

1. The combination in a car provided with an opening in its top, of a socket piece or lining for said opening provided at or near its upper edge with a stop projection, means for securing said socket piece in place from the under side of the roof of the car, and a thermometer contained within a case and supported within the car, the said case being provided with a stop adapted to engage the stop projection of the socket piece, substantially as described.

2. The combination with a car, of a socket piece extending through the top of the car, and provided with an internal flange or stop, a thermometer, a case therefor provided with an external stop adapted to make contact with the stop in the socket piece, a cap for the said socket piece and a chain extending from the said cap to the case of the thermometer, substantially as described.

In testimony whereof I have signed my name to this specification in the presence of two subscribing witnesses.

WILLIAM E. EASTMAN.

Witnesses:
 GEORGE F. HARRIMAN,
 JAMES D. FESSENDEN.